July 14, 1953     G. H. CARTER     2,645,086
REVERSIBLE HYDRAULIC PUMP AND TURBINE TRANSMISSION
Filed Dec. 16, 1948     2 Sheets-Sheet 1
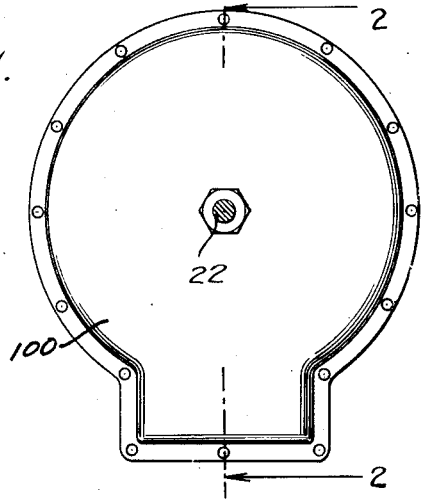
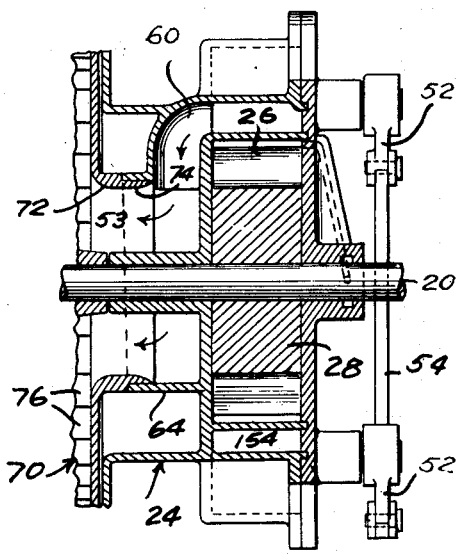
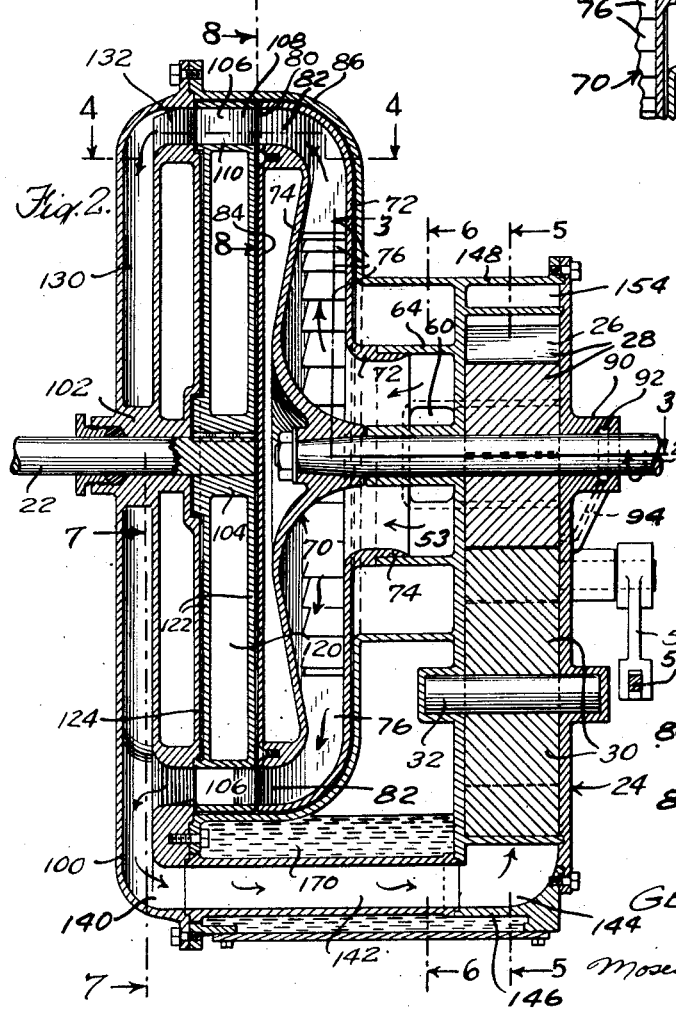
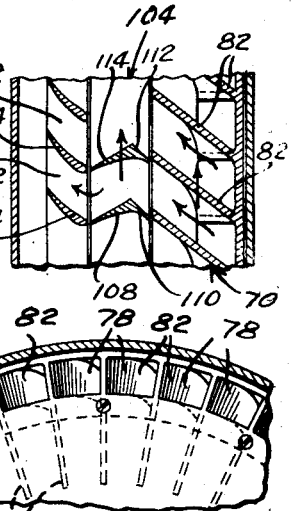
INVENTOR
GEORGE H. CARTER
BY
Moses, Nolte, Cravo + Berry
ATTORNEYS July 14, 1953  G. H. CARTER  2,645,086
REVERSIBLE HYDRAULIC PUMP AND TURBINE TRANSMISSION
Filed Dec. 16, 1948  2 Sheets-Sheet 2

INVENTOR.
GEORGE H. CARTER.
BY
Moies, Nolte, Cravo + Berry
ATTORNEYS

Patented July 14, 1953

2,645,086

UNITED STATES PATENT OFFICE 2,645,086

REVERSIBLE HYDRAULIC PUMP AND TURBINE TRANSMISSION

George H. Carter, Port Washington, N. Y.

Application December 16, 1948, Serial No. 65,665

8 Claims. (Cl. 60—54)

The invention relates to fluid drives or transmissions by which power is transmitted from a driving member such as an internal engine to a driven member.

The invention is particularly applicable to transmissions for automotive vehicles, although it may be used for other purposes where a fluid drive is appropriate. Fluid drives as now used upon many automobiles are subject to certain limitations among which may be mentioned the fact that the operation of the car is not so completely under the control of the driver as is the case with the usual mechanical transmission. For example, the engine is not as effectively usable as a brake. Furthermore, with the ordinary fluid drive, the acceleration is slow when starting or driving against heavy resistance. In accordance with the present invention a positive flow of fluid is produced which enables the power of the engine to be more effectively applied under adverse conditions. Also the drive may be adjusted so as to produce a true neutral condition when desired so that no power is transmitted from the engine to the wheels. The drive may be adjusted so as to reverse the flow thereby enabling the engine to act as an effective brake.

The general objects of the invention are to overcome the defects indicated and other defects of existing fluid drives and to provide a drive which is positive in action, capable of being put into effective neutral condition and capable of producing a proper braking action. As a result the vehicle is always under the complete control of the driver.

Other objects and advantages of the invention will appear in the course of the following description of one preferred embodiment thereof.

In the accompanying drawings which show a preferred embodiment of the drive as adapted to an automobile transmission:

Figure 1 is an end view of the drive casing;

Figure 2 is a vertical longitudinal section of the drive on line 2—2 of Fig. 1;

Figure 3 is a horizontal section of a part of the drive taken on line 3—3 of Fig. 2;

Figure 4 is a transverse section through a part of the drive taken on line 4—4 of Fig. 2;

Figure 8 is a fragmentary face view of a part of the rotary distributor, partly in section on line 8—8 of Fig. 2.

Figure 5:
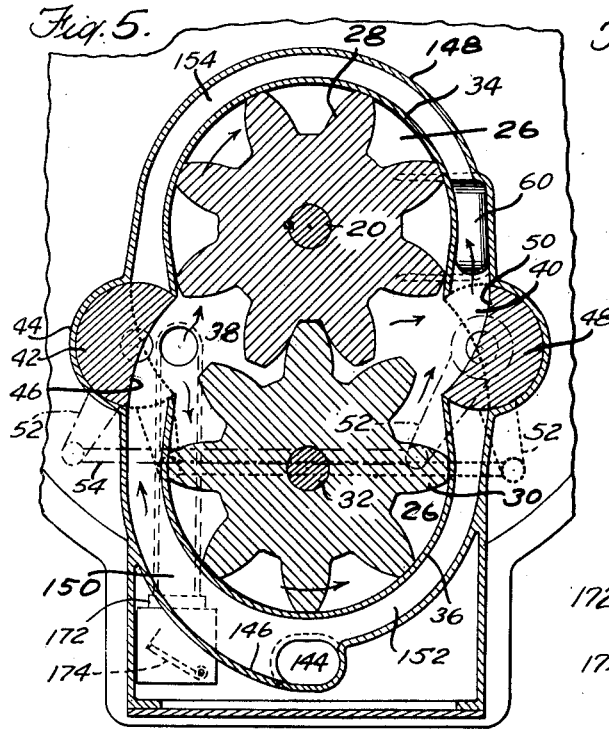
Figure 5 is a transverse vertical section of the drive taken on line 5—5 of Fig. 2.
Figure 6:
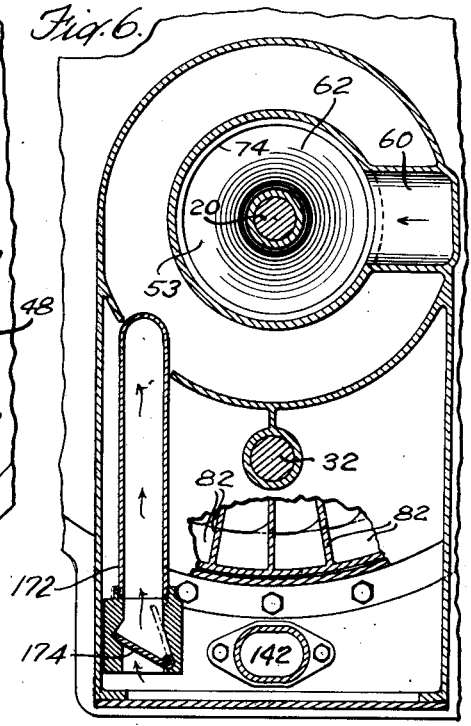
Figure 6 is a similar section taken on line 6—6 of Fig. 2.
Figure 7:
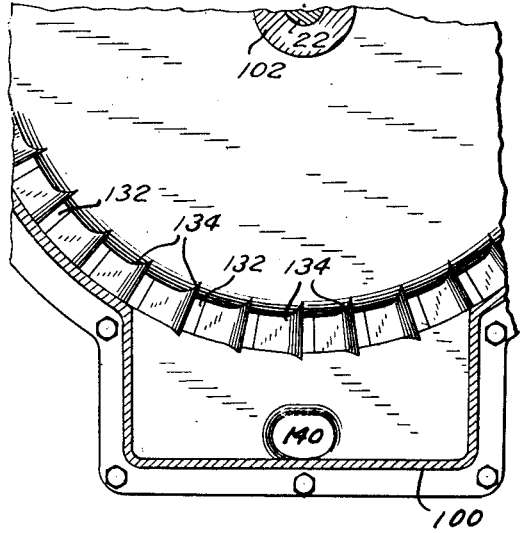
Figure 7 is a similar section of the lower part of the drive taken on line 7—7 of Fig. 2.

Referring to the drawings in detail 20 is the driving shaft which may be considered as an extension of the crank shaft of an internal combustion engine, not shown. 22 is the driven shaft which may be considered as the propeller shaft of a motor vehicle which is geared through the usual differential, not shown, to the vehicle driving wheels. 24 is a suitable fluidtight casing which is mounted upon the vehicle frame and bolted to the engine, or otherwise fixed upon the vehicle. The casing 24 includes a pump compartment 26 in which is mounted a positive flow pump such as a gear pump which is illustrated as comprising a gear 28 keyed to the driving shaft 20 and an idler gear 30 rotating on or with a short shaft 32 mounted in bearings in the casing. The pump chamber 26 has curved walls 34 and 36 with which the ends of the teeth rotate in close contact in the usual manner of gear pumps. The chamber 26 is also provided with an inlet opening 38 and a discharge opening 40. The inlet opening is governed by an inlet valve 42 which is shown as a plug valve rotating in a cylindrical chamber 44 and having a cut-out part 46. The discharge valve 48 is of similar construction and has a cut-out portion 50. These two valves are preferably provided with operating levers 52 which are connected by a link 54 so that the two valves will rotate together.

The discharge from the pump when in normal operation passes through a duct 60 into a circular chamber 53 surrounded by an annular wall 64 which forms a part of the casing.

Keyed to the end of shaft 20 is a rotary distributor 70 which has a neck portion 72 fitting against the end of the wall 64 and preferably provided with flange 74 fitting within the wall so as to rotate freely therein, but to fit close enough to prevent substantial leakage between the wall and the neck. The distributor 70 has an outer wall 72 to which the neck is attached, and an inner wall 74. These walls are connected near their peripheral portions by webs or vanes 76 which extend from the outer margin of the distributor inward in a general radial direction for a part of the diameter of the distributor, for example, about one-third of the way in towards the center. The walls 72 and 74 of the distributor curve at their peripheries into portions parallel with the axis of the shaft 20, and the webs 76 are similarly curved so as to produce an annular series of discharge openings 78 at the outlet face 80 of the distributor. The outer portions of the webs are inclined, as clearly shown at 82 in Fig. 4, so as to discharge the liquid flowing between them in an angular direction to the axis of rotation of the distributor, the liquid being directed forwardly in the direction of rotation. The liquid thus issues in the form of a plurality of forwardly inclined jets. It will be seen that the liquid is forced through the distributor from the outlet orifice 60 of the pump through the space surrounded by wall 64 and the neck 72 of the distributor.

The inner wall 74 of the distributor is shown as suitably curved so as to promote a streamlined flow of the liquid, and affixed to its outer face is a filler plate 84 which provides the distributor with a substantially plane face 80. The space between the wall 74 and the plate 84 is merely a void space. The distributor 72 rotates inside of a shell 86 constituting a part of the casing 24.

The shaft 20 rotates in a suitable bearing 90 in the wall of the casing, such bearing being shown as provided with an oil catching groove 92 provided with a drain passage 94 leading to the casing adjacent to the pump inlet opening 38. As such region is always under negative pressure due to the action of the pump, any oil leakage will be drawn back into the pump and will not escape to the outside of the casing.

The opposite side of the casing from the pump chamber is closed by removable wall 100 which has a bearing portion 102 in which the driven shaft 22 rotates. On the end of the shaft 22 is keyed a turbine rotor 104 which has formed through its peripheral portion a plurality of fluid passages 106 separated by turbine blades 108. The turbine blades are preferably equal in number and spacing to the webs 82 in the distributor. They are preferably provided with concave faces 110 and with angularly shaped backs having wall portions 112 inclined at about the same inclination as the inclination of the webs 82, and wall portions 114 inclined at an opposite but less inclination than the walls 112. The part of the turbine between the turbine hub and the blades is preferably a hollow or void space 120 enclosed between the flush side walls 122 of the turbine. These walls revolve in closely spaced relationship to the plate 84 and the inner wall 124 of the casing portion 100. Sufficient clearance is allowed to provide free rotation, but otherwise is kept as low as possible so as to avoid the presence of any large body of the liquid at these points.

The casing portion 100 has a circular chamber 130 therein at the periphery of which are a plurality of fluid passages 132, separated by guide blades 134 which of course are stationary. The liquid from the chamber 130 is discharged through a port 140 and passes through a passage 142 in the lower part of the casing to a port 144 below the pump chamber. The casing is formed with a wall 146 enclosing the lower part of the pump chamber and a wall 148 enclosing the upper part of the pump chamber. Between the wall 36 of the pump chamber and wall 146 is a passage 150 through which the liquid passes from the port 144 to the inlet opening 38 of the pump.

When the valves 42 and 48 are set in normal operating position, as shown in full lines in Fig. 5, the liquid is discharged by the pump through the opening 40 and passes through the duct 60 and through the distributor neck and is forced out between the webs 82. This liquid impinges upon the curved faces 110 of the turbine blades 108, and is discharged from the turbine blades against guide blades 134 and from thence passes into the chamber 130, through the port 140, passage 142, port 144, passage 150 and back to the pump through the inlet opening 38.

When the valves 42 and 48 are shifted to reverse position, as shown in dotted lines in Fig. 5, then the liquid discharged by the pump passes out of the opening 40 and is directed by the valve 48 through the passage 152 between the pump chamber wall and the casing wall 146 to the port 144. The liquid cannot pass through the passage 150 because this is now closed at its upper end by the valve 42. The liquid passes from the port 144 through the passage 142 in reversed direction and into the chamber 130 and is discharged between the stationary blades 134 against the inclined surfaces 114 on the backs of the turbine blades. The liquid passes between the distributor webs in reverse direction out through the neck 72 and duct 60 into a passage 154 between the pump chamber wall and wall 148. It passes from the passage 154 through the valve 42 and into the inlet opening 38. In this valve setting the valve 48 closes the opening from the discharge opening 40 to the duct 60.

When the valves are set for normal operation in the position shown in full lines in Fig. 5, it will be seen that the liquid is positively discharged by the gear pump into the rotary distributor 70 and is forcibly discharged between the webs or veins of the latter against the curved faces 110 of the turbine blades from which the liquid under pressure issues between the fixed guide blades 134. This forcible flow of the liquid between the turbine blades tends to cause the turbine to rotate in the same direction as the distributor so as to rotate shaft 22 in the same direction as the driving shaft 20. When the engine is going slowly, the rotation of the pump gears and of the distributor is also slow and the force applied to the turbine is small. Until this force becomes sufficient to overcome the resistance to rotation of the shaft 22, this shaft and the turbine will not move, and the vehicle will remain stationary or approximately so. As the speed of the engine is increased the pressure of the liquid discharged by the gear pump is increased, and the rate of rotation of the turbine will increase. Eventually, as for example when the vehicle is driven along a level road, the speed of the turbine will increase until it is the same or approximately the same as the speed of rotation of the distributor. At this point a condition of direct drive from the driving shaft to the driven shaft will obtain. If increased resistance to movement of the vehicle occurs, as for example in climbing a hill, then the speed of rotation of the shaft 22 will be decreased, and there will be slippage between the turbine and the distributor with corresponding increase in force applied so as to overcome the resistance of climbing the hill.

Where the vehicle is driven on a level road, or a slight down grade, and this condition obtains for a sufficient distance, the power required may decrease to a point where the turbine rotor will be driven faster than the distributor so that the effect of an overdrive is obtained.

Owing to the fact that the gear pump is a positive acting pump which will pump a definite volume of liquid depending upon the speed of rotation of the shaft 20, it is possible to secure a definite accelerating action of the transmission. In other words, the power delivered will increase with the acceleration of the engine and the driver can produce such acceleration of the car as the engine is capable of producing, as in the case of an ordinary gear transmission. There is not the lag over which the driver has no control as in the case of the ordinary fluid drives now in use.

When the valves are moved to reverse position, as shown in dotted lines in Fig. 5, then the circulation from the pump is reversed, as already described. The fluid will be forced positively against the backs of the turbine blades so that the turbine will be retarded in its rotation and will clearly oppose the rotation of shaft 22. It will thus act as a brake to restrain the forward movement of the vehicle. This is an effect which is not satisfactorily secured by the ordinary fluid drive which does not produce a proper braking effect, thus forcing the driver to rely on the usual frictional car brakes. This results in poor control of the vehicle and increased wear on the brakes.

Figure 9:
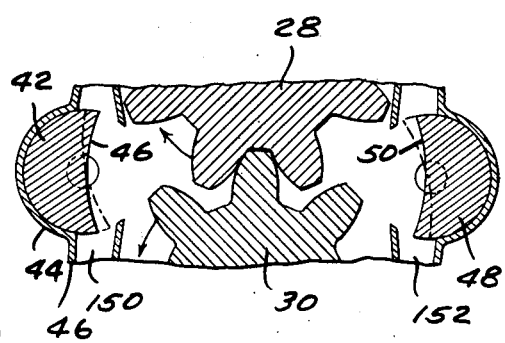
Figure 9 is a fragmentary view similar to Fig. 5 showing the valves in neutral position.

The valves 42 and 48 may also be set so as to throw the transmission into a true neutral position. This setting of the valves is indicated in Fig. 9 where it will be seen that both valves are partly open so that the liquid pumped by the pump will merely be circulated through the passages 154, 152 and 150 from the discharge opening 40 to the inlet opening 38. There will thus be no pressure through the turbine and any slight flow which may take place through the distributor and turbine and normal operating passages will be negligible and will apply no substantial force to the turbine and driven shaft. There is thus no creeping effect produced as is the case with the usual fluid transmissions. In case there should be any tendency for the rotation of the distributor to build up small pressures in the turbine by reason of centrifugal action, this may be neutralized by setting the valves slightly beyond mid-position in the direction of reverse position as indicated in dotted lines in Fig. 9 so that there will be a very slight reverse pressure upon the turbine which will counteract any centrifugal effect.

It will be seen that the whole system is enclosed in the fluidtight casing 24 so that there will be no substantial loss of liquid. Such leakage as takes place from the pump and between the adjacent surfaces of the distributor, turbine and casing portion 100 will accumulate in the bottom of the casing as indicated at 170 so that the lower part of the casing constitutes a liquid reservoir. Leading down to this reservoir from the pump inlet is a pipe 172 at the lower end of which is an upwardly opening check valve 174. As soon as there is any loss of liquid from the system through which the liquid normally flows, there will be a slight vacuum created by the pump and sufficient liquid will be drawn up through the check valve to replenish the supply and keep the circulating system completely filled at all times.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be embodied.

I claim:

1. A fluid transmission comprising a gear pump having rotary gears and a stationary casing, at least one of said gears being connected to a source of power, a rotary fluid distributor connected to rotate with an element of the gear pump, a turbine connected with a driven member, a fixed vaned member adjacent to that part of the turbine constituting the outlet during forward operation, and a closed fluid circulatory system through which the fluid circulates from the pump through the distributor, turbine and vaned member and back to the pump, said circulatory system including duct means of such capacity as to carry the entire body of fluid delivered by the pump to the distributor and to return the entire body of fluid passing through the turbine back to the pump, the capacity of the pump being sufficient to maintain a continuous operative circulation of liquid through the distributor, turbine and pump.

2. A fluid transmission comprising a driving shaft, a positive flow pump driven thereby, a rotary distributor mounted on said driving shaft and having a plurality of vanes adjacent to its periphery, said vanes being inclined in a direction to cause fluid flowing through said distributor to be ejected forwardly in the direction of rotation of the distributor, a driven shaft mounted in alignment with the driving shaft, a rotary turbine having blades adjacent to its periphery receiving the fluid from said distributor, a stationary member mounted on the other side of said turbine from said distributor having guide vanes receiving fluid from the blades on the turbine, and a closed fluid circulating system through which the fluid flows from the pump through the distributor, turbine and vaned member and back to the pump, said circulatory system including duct means of such capacity as to carry the entire body of fluid delivered by the pump to the distributor and to return the entire body of fluid pasisng through the turbine back to the pump, the capacity of the pump being sufficient to maintain a continuous operative circulation of liquid through the distributor, turbine and pump.

3. A fluid transmission as claimed in claim 2 in which the turbine blades are concave on their faces and have angular back surfaces.

4. A fluid transmission as clamed in claim 2 in which the distributor comprises a pair of spaced circular walls with the vanes between them, the vanes extending part way towards the center of the distributor.

5. A fluid transmission as claimed in claim 2 having valve means in the fluid circulatory system for reversing the direction of flow from the pump to the turbine whereby fluid delivered by the pump will retard the forward rotary movement of the turbine when the flow is reversed.

6. A fluid transmission comprising a fixed casing having a pump compartment, a driving shaft passing through said compartment, a gear pump in said pump compartment, one element of which is fixed to said driving shaft, a hollow disc-like distributor mounted on said driving shaft, said distributor having spaced walls connected by vanes so as to provide discharge paths inclined in the direction of rotation of the distributor, a casing portion enclosing said distributor, a driven shaft, a turbine disc mounted on said driven shaft and rotating in said casing portion adjacent said distributor, said turbine having blades near the periphery receiving fluid discharged from between the vanes of the distributor, said casing having a hollow portion adjacent to said turbine, said hollow portion containing fixed guide vanes receiving fluid discharged from between the blades of the turbine and means for conducting the fluid discharged by said guide vanes back to the pump.

7. A fluid transmission comprising a fixed casing having a pump compartment, a driving shaft passing through the said compartment, a gear pump in said pump compartment, one element of which is fixed to said driving shaft, a hollow disc-like distributor mounted on said driving shaft, said distributor having spaced walls connected by vanes extending to the periphery of the distributor so as to provide discharge paths inclined in the direction of rotation of the distributor, a casing portion enclosing said distributor, a driven shaft, a turbine disc mounted on said driven shaft and rotating in said casing portion adjacent said distributor, said turbine having blades near its periphery receiving the fluid discharged from between the vanes of the distributor, said casing having a hollow portion adjacent to said turbine, said hollow portion containing fixed guide vanes receiving fluid discharged from between the blades of the turbine and means for conducting the fluid discharged by said guide vanes back to the pump, said pump chamber having inlet and outlet openings, by-passes around the pump chamber and valves associated therewith for reversing the direction of flow between the pump and the turbine.

8. A fluid transmission comprising a fixed casing having a pump compartment, a driving shaft passing through said compartment, a gear pump in said pump compartment, one element of which is fixed to said driving shaft, a hollow disc-like distributor mounted on said driving shaft, said distributor having spaced walls connected by vanes extending to the periphery of the distributor so as to provide discharge paths inclined in the direction of rotation to the distributor, a casing portion enclosing said distributor, a driven shaft, a turbine disc mounted on said driven shaft and rotating in said casing portion adjacent said distributor, said turbine having blades near the periphery receiving the fluid discharged from between the vanes of the distributor, said casing having a hollow portion adjacent to said turbine, said hollow portion containing fixed guide vanes receiving fluid discharged from between the blades of the turbine, and means for conducting the fluid discharged between said guide vanes back to the pump, said pump chamber having inlet and outlet openings, and valve means associated therewith by which the flow to the pump may be by-passed from the inlet to the outlet so as to produce a neutral condition of the transmission.

GEORGE H. CARTER.

References Cited in the file of this patent

UNITED STATES PATENTS

| Number | Name | Date |
|---|---|---|
| 662,975 | Sauer | Dec. 4, 1900 |
| 1,062,876 | Blymyer | May 27, 1913 |
| 1,078,710 | Weir | Nov. 18, 1913 |
| 1,285,822 | Smith | Nov. 26, 1918 |
| 2,168,863 | De Lavaud | Aug. 8, 1939 |
| 2,357,295 | Thompson | Sept. 5, 1944 |
| 2,443,527 | Wirth et al. | June 15, 1948 |